US 8,126,776 B2

(12) United States Patent
Messa et al.

(10) Patent No.: US 8,126,776 B2
(45) Date of Patent: Feb. 28, 2012

(54) METHOD AND SYSTEMS FOR PERSONAL RESTAURANT ASSISTANT

(75) Inventors: Suzette Messa, Ben Lomond, CA (US); Mark Orttung, Menlo Park, CA (US)

(73) Assignee: Rearden Commerce, Inc., San Mateo, CA (US)

( * ) Notice: Subject to any disclaimer, the term of this patent is extended or adjusted under 35 U.S.C. 154(b) by 168 days.

(21) Appl. No.: 11/480,106

(22) Filed: Jun. 30, 2006

(65) Prior Publication Data
US 2008/0004964 A1  Jan. 3, 2008

(51) Int. Cl.
*G06F 17/60* (2006.01)
*G06Q 20/00* (2006.01)

(52) U.S. Cl. ............................................ 705/15; 705/17

(58) Field of Classification Search .................. None
See application file for complete search history.

(56) References Cited

U.S. PATENT DOCUMENTS

| | | |
|---|---|---|
| 5,021,953 A | 6/1991 | Webber et al. |
| 5,191,523 A | 3/1993 | Whitesage |
| 5,237,499 A | 8/1993 | Garback |
| 5,319,542 A | 6/1994 | King et al. |
| 5,331,546 A | 7/1994 | Webber et al. |
| 5,475,740 A | 12/1995 | Biggs et al. |
| 5,570,283 A | 10/1996 | Shoolery et al. |
| 5,655,008 A | 8/1997 | Futch et al. |
| 5,732,398 A | 3/1998 | Tagawa |
| 5,799,286 A | 8/1998 | Morgan et al. |
| 5,819,092 A | 10/1998 | Ferguson et al. |
| 5,832,451 A | 11/1998 | Flake et al. |
| 5,832,453 A | 11/1998 | O'Brien |
| 5,839,114 A | 11/1998 | Lynch et al. |
| 5,842,178 A | 11/1998 | Giovannoli |
| 5,852,812 A | 12/1998 | Reeder |
| 5,870,721 A | 2/1999 | Norris |
| 5,893,077 A | 4/1999 | Griffin |
| 5,897,620 A | 4/1999 | Walker et al. |
| 5,948,040 A | 9/1999 | DeLorme et al. |
| 5,987,425 A | 11/1999 | Hartman et al. |
| 5,991,742 A | 11/1999 | Tran |
| 6,018,715 A | 1/2000 | Lynch et al. |
| 6,023,679 A | 2/2000 | Acebo et al. |

(Continued)

FOREIGN PATENT DOCUMENTS

CA    2291463    6/2001

OTHER PUBLICATIONS

Fair Isaac Corporation, "What's in Your Score," www.myfico.com, Feb. 9, 2005.

(Continued)

*Primary Examiner* — Mussa A Shaawat
(74) *Attorney, Agent, or Firm* — Greenberg Traurig, LLP

(57) ABSTRACT

A method and systems for a personal restaurant assistant. In one embodiment, the method, that may be implemented on a system, comprises identifying from an invoice for a group of diner's having ordered meals, charge items from the invoice to be allocated to one or more of the diners; transmitting over a network connection to a service provider, the identification of the charge items having been allocated to the one or more diners, to have calculated an allocated amount of the invoice for the one or more diners; and receiving over the network connection from the service provider, a calculated allocated amount of the invoice for the one or more diners.

13 Claims, 2 Drawing Sheets

U.S. PATENT DOCUMENTS

| | | | |
|---|---|---|---|
| 6,029,144 A | 2/2000 | Barrett et al. | |
| 6,058,375 A | 5/2000 | Park | |
| 6,070,798 A | 6/2000 | Nethery | |
| 6,119,094 A | 9/2000 | Lynch et al. | |
| 6,195,420 B1 | 2/2001 | Tognazzini | |
| 6,230,204 B1 | 5/2001 | Fleming | |
| 6,295,521 B1 | 9/2001 | DeMarcken et al. | |
| 6,304,850 B1 | 10/2001 | Keller et al. | |
| 6,377,932 B1 | 4/2002 | DeMarcken | |
| 6,411,940 B1 | 6/2002 | Egendorf | |
| 6,435,406 B1* | 8/2002 | Pentel | 235/380 |
| 6,442,526 B1 | 8/2002 | Vance et al. | |
| 6,477,520 B1 | 11/2002 | Malaviya et al. | |
| 6,571,213 B1 | 5/2003 | Altendahl et al. | |
| 6,622,084 B2 | 9/2003 | Cardno et al. | |
| 6,631,184 B1 | 10/2003 | Weiner | |
| 6,701,311 B2 | 3/2004 | Biebesheimer et al. | |
| 6,711,548 B1 | 3/2004 | Rosenblatt | |
| 6,715,073 B1 | 3/2004 | An et al. | |
| 6,816,882 B1 | 11/2004 | Conner et al. | |
| 6,839,679 B1 | 1/2005 | Lynch et al. | |
| 6,842,737 B1 | 1/2005 | Stiles et al. | |
| 6,847,988 B2 | 1/2005 | Toyouchi et al. | |
| 6,904,411 B2 | 6/2005 | Hinkle | |
| 6,920,431 B2* | 7/2005 | Showghi et al. | 705/15 |
| 6,959,298 B1 | 10/2005 | Silverbrook et al. | |
| 6,959,327 B1 | 10/2005 | Vogl et al. | |
| 6,961,773 B2 | 11/2005 | Hartman et al. | |
| 6,965,868 B1 | 11/2005 | Bednarek | |
| 6,970,831 B1 | 11/2005 | Anderson et al. | |
| 6,980,885 B2 | 12/2005 | Ye et al. | |
| 7,006,986 B1 | 2/2006 | Sines et al. | |
| 7,050,986 B1 | 5/2006 | Vance et al. | |
| 7,076,451 B1 | 7/2006 | Coupland et al. | |
| 7,080,096 B1 | 7/2006 | Imamura | |
| 7,117,170 B1 | 10/2006 | Bennett et al. | |
| 7,136,821 B1 | 11/2006 | Kohavi et al. | |
| 7,139,728 B2 | 11/2006 | Rigole | |
| 7,194,417 B1 | 3/2007 | Jones | |
| 7,206,763 B2 | 4/2007 | Turk | |
| 7,206,768 B1 | 4/2007 | deGroeve et al. | |
| 7,222,084 B2 | 5/2007 | Archibald et al. | |
| 7,228,313 B1 | 6/2007 | Hand et al. | |
| 7,236,957 B2 | 6/2007 | Crosson | |
| 7,272,568 B1 | 9/2007 | Birch et al. | |
| 7,272,626 B2 | 9/2007 | Sahai et al. | |
| 7,302,399 B1 | 11/2007 | Donovan et al. | |
| 7,315,824 B2 | 1/2008 | Chen et al. | |
| 7,356,516 B2 | 4/2008 | Richey et al. | |
| 7,363,242 B2 | 4/2008 | Lewis et al. | |
| 7,363,267 B1 | 4/2008 | Vincent et al. | |
| 7,379,890 B2 | 5/2008 | Myr et al. | |
| 7,383,231 B2 | 6/2008 | Gupta et al. | |
| 7,388,495 B2 | 6/2008 | Fallin et al. | |
| 7,401,029 B2 | 7/2008 | Gillespie | |
| 7,451,106 B1 | 11/2008 | Gindlesperger | |
| 7,457,950 B1 | 11/2008 | Brickell et al. | |
| 7,496,520 B1 | 2/2009 | Handel et al. | |
| 7,499,864 B2 | 3/2009 | Campbell et al. | |
| 7,539,620 B2 | 5/2009 | Winterton et al. | |
| 7,548,615 B2 | 6/2009 | Bhalgat et al. | |
| 7,562,027 B1 | 7/2009 | Baggett et al. | |
| 7,574,372 B2 | 8/2009 | Among et al. | |
| 7,587,370 B2 | 9/2009 | Himmelstein | |
| 7,596,566 B1 | 9/2009 | Patwardhan | |
| 7,599,877 B1 | 10/2009 | Cole et al. | |
| 7,660,743 B1 | 2/2010 | Messa et al. | |
| 2001/0003815 A1 | 6/2001 | Nakano | |
| 2001/0051917 A1 | 12/2001 | Biaaonette et al. | |
| 2002/0010612 A1 | 1/2002 | Smith et al. | |
| 2002/0016729 A1 | 2/2002 | Breitenbach et al. | |
| 2002/0059092 A1 | 5/2002 | Naito et al. | |
| 2002/0095347 A1 | 7/2002 | Cummiskey | |
| 2002/0103693 A1 | 8/2002 | Bayer et al. | |
| 2002/0111886 A1 | 8/2002 | Chenevich et al. | |
| 2002/0120478 A1 | 8/2002 | Tanaka | |
| 2002/0120548 A1 | 8/2002 | Etkin | |
| 2002/0143677 A1 | 10/2002 | Prakash | |
| 2002/0152101 A1 | 10/2002 | Lawson et al. | |
| 2002/0156687 A1 | 10/2002 | Carr et al. | |
| 2002/0184102 A1 | 12/2002 | Markopoulos et al. | |
| 2003/0023463 A1 | 1/2003 | Dombroski et al. | |
| 2003/0036930 A1 | 2/2003 | Matos et al. | |
| 2003/0036981 A1 | 2/2003 | Vaughan et al. | |
| 2003/0040987 A1 | 2/2003 | Hudson et al. | |
| 2003/0046195 A1 | 3/2003 | Mao | |
| 2003/0050879 A1 | 3/2003 | Rosen et al. | |
| 2003/0078800 A1 | 4/2003 | Salle et al. | |
| 2003/0105711 A1 | 6/2003 | O'Neil | |
| 2003/0110062 A1 | 6/2003 | Mogler et al. | |
| 2003/0110136 A1 | 6/2003 | Wells et al. | |
| 2003/0120477 A1 | 6/2003 | Kruk et al. | |
| 2003/0120526 A1 | 6/2003 | Altman et al. | |
| 2003/0149653 A1 | 8/2003 | Penney et al. | |
| 2003/0177045 A1 | 9/2003 | Fitzgerald et al. | |
| 2003/0182413 A1 | 9/2003 | Allen et al. | |
| 2003/0191725 A1 | 10/2003 | Ratliff et al. | |
| 2003/0200111 A1 | 10/2003 | Damji | |
| 2003/0204474 A1 | 10/2003 | Capek et al. | |
| 2003/0229529 A1 | 12/2003 | Mui et al. | |
| 2003/0236722 A1 | 12/2003 | Kamel | |
| 2004/0002876 A1 | 1/2004 | Sommers et al. | |
| 2004/0034593 A1 | 2/2004 | Toneguzzo et al. | |
| 2004/0044556 A1 | 3/2004 | Brady et al. | |
| 2004/0044600 A1 | 3/2004 | Chu et al. | |
| 2004/0044644 A1 | 3/2004 | Brady et al. | |
| 2004/0044673 A1 | 3/2004 | Brady et al. | |
| 2004/0044681 A1 | 3/2004 | Brady et al. | |
| 2004/0049413 A1 | 3/2004 | Momma et al. | |
| 2004/0064351 A1 | 4/2004 | Mikurak | |
| 2004/0073615 A1 | 4/2004 | Darling | |
| 2004/0098606 A1 | 5/2004 | Tan et al. | |
| 2004/0117275 A1 | 6/2004 | Billera | |
| 2004/0143498 A1 | 7/2004 | Umeda | |
| 2004/0143522 A1 | 7/2004 | Wall et al. | |
| 2004/0148219 A1 | 7/2004 | Norris | |
| 2004/0153348 A1 | 8/2004 | Garback | |
| 2004/0167808 A1 | 8/2004 | Fredericks et al. | |
| 2004/0193457 A1 | 9/2004 | Shogren | |
| 2004/0210487 A1 | 10/2004 | Fujimoto et al. | |
| 2004/0249684 A1 | 12/2004 | Karppinen | |
| 2004/0249745 A1 | 12/2004 | Baaren | |
| 2004/0260601 A1 | 12/2004 | Brief | |
| 2004/0260603 A1 | 12/2004 | Marmotta | |
| 2005/0004819 A1 | 1/2005 | Etzioni et al. | |
| 2005/0004830 A1 | 1/2005 | Rozell et al. | |
| 2005/0033614 A1 | 2/2005 | Lettovsky et al. | |
| 2005/0033616 A1 | 2/2005 | Vavul et al. | |
| 2005/0033631 A1 | 2/2005 | Wefers et al. | |
| 2005/0043985 A1 | 2/2005 | Gillespie | |
| 2005/0043996 A1* | 2/2005 | Silver | 705/15 |
| 2005/0060271 A1 | 3/2005 | Vig | |
| 2005/0065821 A1 | 3/2005 | Kalies | |
| 2005/0086088 A1 | 4/2005 | Stiles et al. | |
| 2005/0108069 A1 | 5/2005 | Shiran et al. | |
| 2005/0108153 A1 | 5/2005 | Thomas et al. | |
| 2005/0119809 A1 | 6/2005 | Chen | |
| 2005/0119931 A1 | 6/2005 | Schall | |
| 2005/0120052 A1 | 6/2005 | Miller et al. | |
| 2005/0132006 A1 | 6/2005 | Horvitz et al. | |
| 2005/0138175 A1 | 6/2005 | Kumar et al. | |
| 2005/0165629 A1 | 7/2005 | Bruns | |
| 2005/0182713 A1 | 8/2005 | Marchesi | |
| 2005/0197913 A1 | 9/2005 | Grendel et al. | |
| 2005/0197915 A1 | 9/2005 | Biwer et al. | |
| 2005/0216375 A1 | 9/2005 | Grendel et al. | |
| 2005/0273345 A1* | 12/2005 | Castillejo Romero | 705/1 |
| 2005/0283389 A1 | 12/2005 | Widjaja et al. | |
| 2005/0288973 A1 | 12/2005 | Taylor et al. | |
| 2006/0010023 A1 | 1/2006 | Tromczynski et al. | |
| 2006/0037016 A1 | 2/2006 | Saha et al. | |
| 2006/0059021 A1 | 3/2006 | Yulman et al. | |
| 2006/0100909 A1 | 5/2006 | Glimp et al. | |
| 2006/0101467 A1 | 5/2006 | Buco et al. | |
| 2006/0123088 A1 | 6/2006 | Simmons et al. | |
| 2006/0143087 A1* | 6/2006 | Tripp et al. | 705/15 |
| 2006/0190314 A1 | 8/2006 | Hernandez | |

| | | | |
|---|---|---|---|
| 2006/0212321 A1 | 9/2006 | Vance et al. | |
| 2006/0224423 A1 | 10/2006 | Sun et al. | |
| 2006/0241966 A1 | 10/2006 | Walker et al. | |
| 2006/0259335 A1 | 11/2006 | La Macchia et al. | |
| 2006/0283935 A1* | 12/2006 | Henry et al. | 235/380 |
| 2006/0287897 A1 | 12/2006 | Sobalvarro et al. | |
| 2007/0005406 A1 | 1/2007 | Assadian et al. | |
| 2007/0021991 A1 | 1/2007 | Etzioni et al. | |
| 2007/0038566 A1 | 2/2007 | Shestakov et al. | |
| 2007/0043651 A1 | 2/2007 | Xiao et al. | |
| 2007/0156546 A1 | 7/2007 | Oppert et al. | |
| 2007/0174154 A1 | 7/2007 | Roberts et al. | |
| 2007/0239548 A1* | 10/2007 | Sears | 705/15 |
| 2007/0273499 A1 | 11/2007 | Chlubek et al. | |
| 2008/0004964 A1 | 1/2008 | Messa | |
| 2008/0065408 A1* | 3/2008 | Salonen | 705/1 |
| 2008/0091481 A1 | 4/2008 | Messa | |
| 2008/0319808 A1 | 12/2008 | Wofford et al. | |
| 2009/0006142 A1 | 1/2009 | Orttung | |
| 2009/0125355 A1 | 5/2009 | Handel | |
| 2009/0240566 A1* | 9/2009 | Lovegreen et al. | 705/10 |
| 2010/0161432 A1* | 6/2010 | Kumanov et al. | 705/15 |
| 2010/0191572 A1 | 7/2010 | Newman et al. | |
| 2011/0173092 A1* | 7/2011 | Werbitt | 705/26.8 |

OTHER PUBLICATIONS

Aberdeen Group, Inc., "Xerox Scraps Paper for an Automated Expense Management Solution and Sees Multiple Millions in Return," Aberdeen Group OnSite: Best Practices, 2002.

Amadeus IT Group SA, "End to End Travel Management from Travel Booking to Expense Management," May 2, 2007.

Business Editors, "Accenture and Captura Form Alliance to Provide Web-Enabled Expense Management Solutions," Business Wire, Aug. 13, 2001.

Datasheet, Gelco Reservation Manager 2.0, Gelco Information Network, Inc., 2003.

Extensity, Inc., "Extensity, Amadeus and e-Travel Team to Provide Integrated Travel and Expense Management Solution," Oct. 24, 2001.

Farber, Dan, "Rearden Commerce Transforms Business Services," ZDNet, Feb. 27, 2005.

IBM Corporation, "American Express, IBM Join Forces to Offer Easy-to-Use Online Tool for Reporting, Reconciling Business Expenses," Mar. 5, 2002.

IBM Corporation, "IBM Introduces Electronic Expense Reporting Solution to Help Companies Eliminate Reimbursement Paper Trail" Aug. 3, 1998.

Zhu, Guangyu et al., "Extracting Relevant Named Entities for Automated Expense Reimbursement," Proceedings of the 13th ACM SIGKDD International Conference on Knowledge Discovery and Data Mining, San Jose, CA, Aug. 2007.

PR Newswire Association, Inc., "WorldTravel BTI Enhances Non-Refundable Tracker with Comprehensive Tracking and Reporting: Improved Offering Helps Corporations Understand and Manage Their Non-Refundable Ticket Patterns," PR Newswire, Jun. 4, 2003.

Elliff, Scott, "Who's Who?: Sorting out the E-Logistics Players," Logistics Management & Distribution Report, pp. E3-E9, Apr. 2001.

Mullen, Theo, "Services Compare Shipping Costs Instantly," InternetWeek, p. 9, Jun. 12, 2000.

Aggarwal, Gautam et al., U.S. Appl. No. 11/319,911, entitled "Method and System for Ranking Services on a Variable Scale of Compliance", filed Dec. 27, 2005.

Billington, Corey A. et al., U.S. Appl. No. 11/093,615, entitled "Cost Method Analysis and breakdown for Cost Buildup", filed Mar. 29, 2005.

Forshaw, David et al., U.S. Appl. No. 11/324,083, entitled "Method and System to Provide Cumulative Budget and Probabilites for a Return on Expenditure for Policy Enforcement," filed Dec. 29, 2005.

Gertsbakh, Ilya et al., "Periodic transportation schedules with flexible departure time. An interactive approach based on the periodic event scheduling program and the deficit function approach," European Journal of Operational Research, Feb. 15, 1991, pp. 298-309, ScienceDirect, Nov. 3, 2008 <http://www.sciencedirect.com/science/article/B6VCT>.

Handel, Sean et al., U.S. Appl. No. 11/187,484, entitled "System and Method for Optimization of Group Shipments to Reduce Shipping Costs", filed Jul. 22, 2005.

Orttung, Mark et al., U.S. Appl. No. 11/027,115, entitled Apparatus and Method to Provide Community Pricing, filed Dec. 30, 2004.

Orttung, Mark et al., U.S. Appl. No. 11/178,033, entitled "Flexible Policy Application to Reduce Travel Costs", filed Jul. 7, 2005.

Patwardhan, Shantau et al., U.S. Appl. No. 11/066,022, entitled System and Method for Flexible Handling of Rules and Regulations in Temporary Labor Hiring, filed Feb. 24, 2005.

Website: "Tax Consequences of Frequent Flyer Mileage Earned on Business Travel", <http://www.ssbb.com/freqfly.html> , Satterlee Stephens Burke & Burke LLP, May 1997, printed Nov. 3, 2008.

Messa, Suzette et al., U.S. Appl. No. 10/966,556, entitled "System for Optimization of Cost Management", filed Oct. 15, 2004.

Transaction History of U.S. Appl. No. 10/966,556, filed Oct. 15, 2004, entitled "System for Optimization of Cost Management."

Transaction History of U.S. Appl. No. 11/027,115, filed Dec. 30, 2004, entitled "Apparatus and Method to Provide Community Pricing."

Transaction History of U.S. Appl. No. 11/066,022, filed Feb. 24, 2005, entitled "System and Method for Flexible Handling of Rules and Regulations in Temporary Labor Hiring."

Transaction History of U.S. Appl. No. 11/093,615, filed Mar. 29, 2005, entitled "Cost Model Analysis and breakdown for Cost Buildup."

Transaction History of U.S. Appl. No. 11/178,033, filed Jul. 7, 2005, entitled "Flexible Policy Application to Reduce Travel Costs."

Transaction History of U.S. Appl. No. 11/187,484, filed Jul. 22, 2005, entitled "System and Method for Optimization of Group Shipments to Reduce Shipping Costs."

Transaction History of U.S. Appl. No. 11/240,740, filed Sep. 30, 2005, entitled "Method and System for Testing of Policies to Determine Cost Savings."

Transaction History of U.S. Appl. No. 11/319,911, filed Dec. 27, 2005, entitled "Method and System for Ranking Services on a Variable Scale of Compliance."

Transaction History of U.S. Appl. No. 11/324,083, filed Dec. 29, 2005, entitled "Method and System to Provide Cumulative Budget and Probabilities for a Return on Expenditure for Policy Enforcement."

Transaction History of U.S. Appl. No. 11/480,106, filed Jun. 30, 2007, entitled "Method and Systems for Personal Restaurant Assistant."

Transaction History of U.S. Appl. No. 11/549,957, filed Oct. 16, 2006, entitled "System and Method for Automatic Review of Travel Changes and Improved Suggestions and Rules Set."

Transaction History of U.S. Appl. No. 11/768,882, filed Jun. 26, 2007, entitled "System and Method for Tracking Spending Based on Reservations and Payments."

\* cited by examiner

METHOD AND SYSTEMS FOR PERSONAL RESTAURANT ASSISTANT

BACKGROUND

When a large group of people dine in a restaurant and each member of the party is paying their own bill, calculating each member's share of the total bill, including each member's share of the tip, can become very complex, particularly if there are shared items, such as appetizers and beverages. For example, sharing a bottle of wine. Usually a restaurant would prefer to bill the whole party as one group, and in some cases it will not bill each member of a group separately.

What is clearly needed is a system and method for a personal restaurant assistant that can help diners in a large party calculate their share of the total bill in a simple, easy-to-use, and elegant manner.

SUMMARY OF THE DESCRIPTION

One embodiment described herein provides a method, that may be implemented on a system, for a personal restaurant assistant. In one embodiment, the method, that may be implemented on a system, comprises identifying from an invoice for a group of diners having ordered meals, charge items from the invoice to be allocated to one or more of the diners; transmitting over a network connection to a service provider, the identification of the charge items having been allocated to the one or more diners, to have calculated an allocated amount of the invoice for the one or more diners; and receiving over the network connection from the service provider, a calculated allocated amount of the invoice for the one or more diners.

DETAILED DESCRIPTION

In the following detailed description of embodiments, reference is made to the accompanying drawings in which like references indicate similar elements, and in which is shown by way of illustration of specific embodiments. These embodiments are described in sufficient detail to enable those skilled in the art to practice the techniques disclosed herein, and it is to be understood that other embodiments may be utilized and that logical, mechanical, electrical, functional, and other changes may be made without departing from the scope of the present inventions. The following detailed description is, therefore, not to be taken in a limiting sense, and the scope of the present disclosure is defined only by the appended claims.

Figure 1:
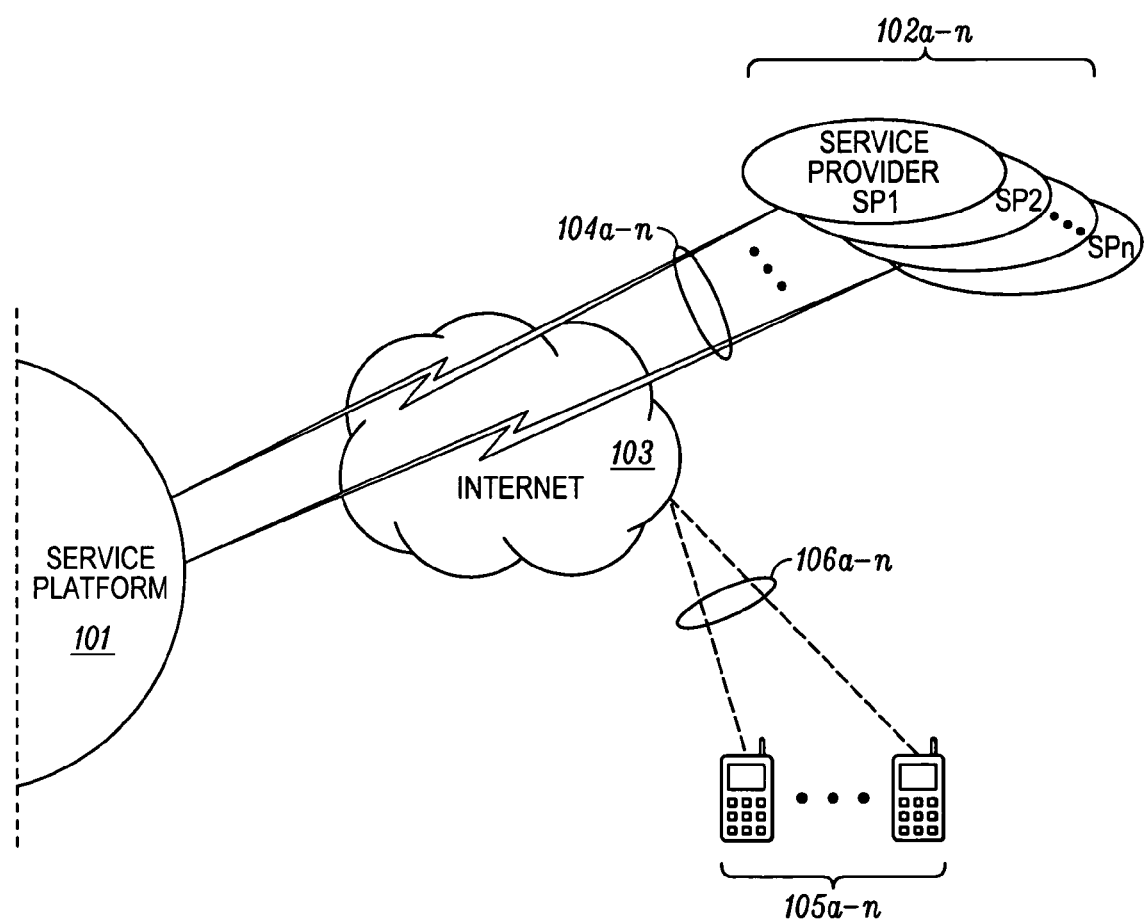
FIG. 1 presents a block diagram of a service platform, in accordance with one embodiment.

FIG. 1 shows an example of a preferred embodiment of the present invention. A service platform 101, which could be, for example, a Rearden eServices Platform communicates through the Internet 103 with service providers SP1-SPn 102 a-n, in this example restaurants that may or may not have connections 104 a-n to the services platform. Users 105 a-n are connected to the Internet via communication pathways 106 a-n, which may typically be wireless devices such as cellular or other data devices. In some cases users may connect through services platform 101 to the service provider; while in other cases the service provider may offer his own local URL, without relying on the availability of the services platform. However, some functions of this embodiment of the present invention may be distributed and actually performed at the services platform, while in other cases the services may be provided entirely by an insular service provider, such as SPx, who does not have an explicit connection to the services platform 101. In yet other cases, the connection of the users to a service provider SPn may rely on such methods as infrared or Bluetooth or WiFi and would not require an actual Internet connection.

Figure 2:
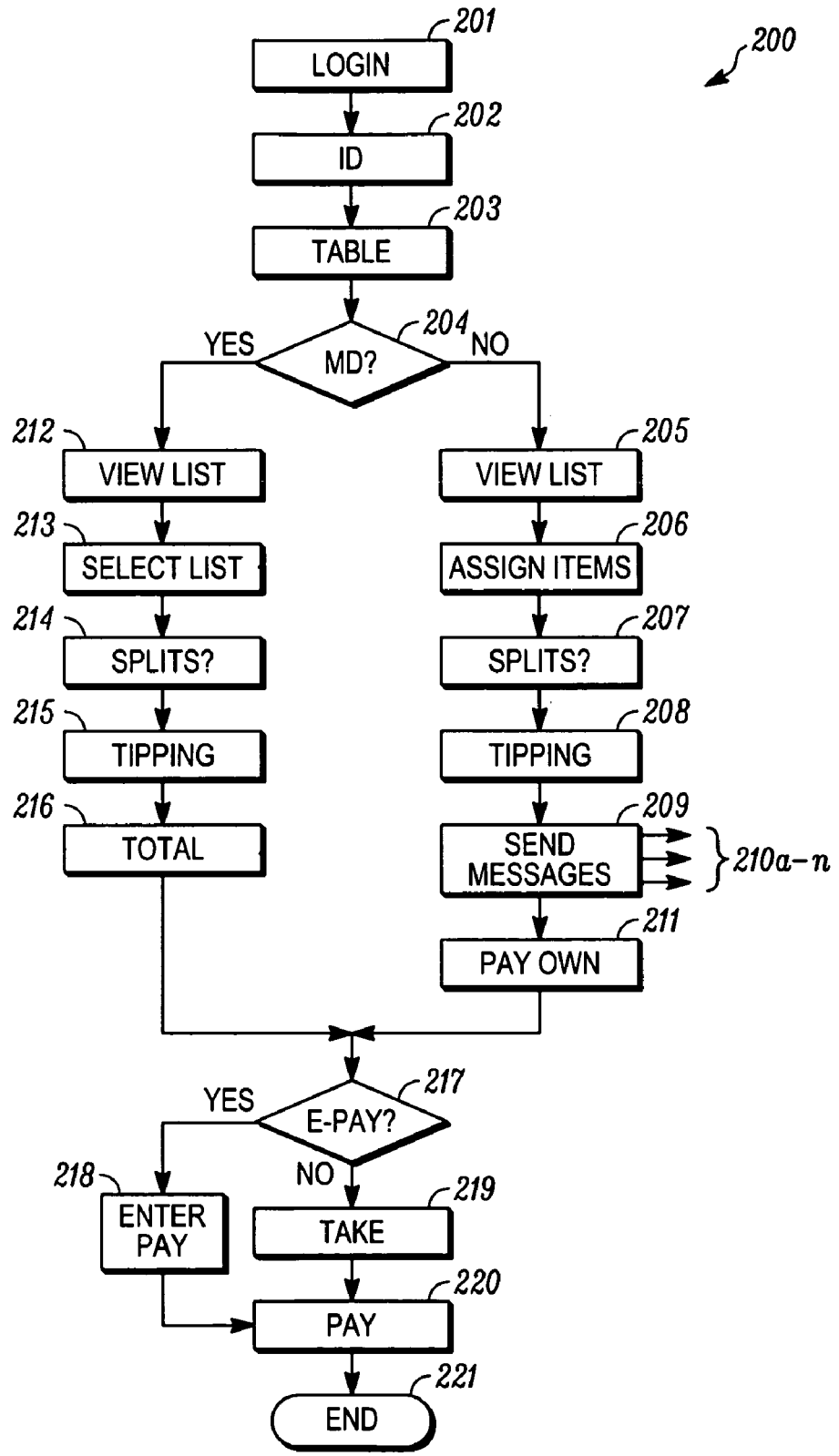
FIG. 2 shows the flow process 200 of a transaction according to this embodiment of the present invention.

FIG. 2 shows the flow process 200 of a transaction according to this embodiment of the present invention. As shown in this exemplary diagram, the flow starts at a point after the food orders are completed—that is, the meal is finished—and the waiter has closed the table ordering so it is ready for payment. It is the electronic equivalent of presenting a paper check, but is different in some key aspects, discussed below. At this point, all ordered (and billable) items have been entered into the service of the table number, typically, and a total is calculated, including applicable taxes, liquor and wine breakouts if required, and in some cases standard tips (as often are charged to larger groups).

In step 201, a user would log in to a specific restaurant service, giving an ID in step 202, and a table number and sometimes a restaurant number in step 203. The ID may depend on the system, whether it's a permanent system ID or a temporary one-time-use ID, such as a code printed on an offering coupon, or a combination of meal ID and table number, printed on an ordering slip. In some cases the necessary information may be presented on a paper slip, like or together with a traditional check. In other cases, the waiter may beam a v-card via InfraRed beam or BlueTooth wireless or similar type of connection to the guest(s).

At step 204, the process branches. One user in a party may act as a "maitre d'," a user who checks all the items that have been ordered and assigns them to individual diners. In some cases, the person(s) may place the order electronically, for example by selecting on a web-style interface that pops up, allowing for full self-service. In yet other cases, the order may be pre-entered, for example on the way to a restaurant or while waiting to be seated. In yet different cases, a regular guest may have his "stored menu", which he may only slightly modify.

If the party does not wish to use a maitre d' (no) the process for each diner moves to step 212, wherein a diner views the list of items that are on the bill for the party, and then in step 213 he selects the items for which he is responsible. In step 214, the diner specifies his portion of a shared (split) item, such as, for example, a shared salad (split 50 percent) or a bottle of wine (split 20 percent). In step 215, the diner may, optionally, add a tip. The current embodiment of this invention may offer various ways to calculate the tip. For example, one method may ask the diner to specify a percentage of his bill and then it may calculate the amount and add it to the bill. Another method of calculating the tip could simply ask the diner to grade the quality of his dining experience, for example, on a scale of 1 to 5, with 1 being "poor" and 5 being "excellent, and then the system could automatically calculate an appropriate tip for the grade. In step 216, the diner views his total bill, and in step 217, the diner selects his method of payment. If, for example, the diner and the restaurant both subscribe to e-pay service (y), which may be any of various online or credit card payment services, in step 218 the diner enters his e-pay PIN, and in step 220 he approves the payment. In step 221 the process terminates. In cases where the diner does not use e-pay (no), he simply notes the amount due in step 219 and pays in step 220 by any of various commonly used means, such as cash or a credit card. At step 221 the process terminates.

At step 204, if the party does wish to use a maitre d' (yes) the process moves to step 205, where the user who is maitre d' views the list of items on the bill. Then in step 206 said user assigns appropriate items to each diner in the group. These group members may already be listed in the system, or the user may be required to enter each member. In step 207 he assigns percentages to diners for shared (split) items, in the same manner as discussed above for step 214. Likewise, he handles tipping in the same manner as discussed above for step 215. In step 209 the user may send out messages for e-pay for users 210 a-n, and in step 211 the user pays his own share by proceeding to step 217 and onward, as discussed above through step 221, The other diners also pay in a similar manner at some point after the maitre d' reaches step 210.

At least some embodiments, and the different structure and functional elements described herein, can be implemented using hardware, firmware, programs of instruction, or combinations of hardware, firmware, and programs of instructions.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes a tangible mechanism that provides (i.e., stores) information in a form accessible by a machine (e.g., a computer, network device, personal digital assistant, manufacturing tool, any device with a set of one or more processors).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. A computer implemented method comprising:
    receiving, by at least one computing device, from each of a plurality of wireless devices, a login for a respective one of a plurality of diners associated with the respective wireless device, the plurality of diners comprising a party associated with an order comprising a plurality of items, such that the login comprises an ID and a table number transmitted to each of the plurality of wireless devices via a wireless transmission from a device operated by a restaurant employee;
    transmitting, by the at least one computing device, to each of the plurality of wireless devices, a bill for the order, the bill comprising the plurality of items;
    receiving, by the at least one computing device, from each of the plurality of wireless devices, a selection of a respective at least one of the plurality of items by the respective diner associated with the respective wireless device;
    receiving, by the at least one computing device, from each of the plurality of wireless devices, a respective tip amount designated by the respective diner associated with the respective wireless device;
    calculating, by the at least one computing device, for each of the plurality of diners, a respective total amount comprising a charge for the respective at least one of the plurality of items selected by the respective diner and the respective tip amount designated by the respective diner;

transmitting, by the at least one computing device, to each of the plurality of wireless devices, the respective total amount for the respective diner associated with the respective wireless device;

receiving, by the at least one computing device, from each of the plurality of wireless devices, a respective electronic payment of the respective total amount for the respective diner associated with the respective wireless device; and receiving, by the at least one computing device, from each of the plurality of wireless devices, a respective grade for the quality of a dining experience from the respective user associated with the respective wireless device, wherein the respective tip amount for the respective diner is determined based on the respective grade received from the respective diner.

2. The computer implemented method of claim 1, wherein the plurality of items comprise food and beverages.

3. The computer implemented method of claim 1, wherein the login is transmitted to each of the plurality of wireless devices as a v-card.

4. The computer implemented method of claim 1, wherein the respective total amount for each of the plurality of diners includes a respective amount for taxes for the respective at least one of the plurality of items selected by the respective diner.

5. A tangible machine readable medium having stored thereon a set of instructions which when executed by a computing device, cause the computing device to perform a method comprising:

receiving, by at least one computing device, from each of a plurality of wireless devices, a login for a respective one of a plurality of diners associated with the respective wireless device, the plurality of diners comprising a party associated with an order comprising a plurality of items, such that the login comprises an ID and a table number transmitted to each of the plurality of wireless devices via a wireless transmission from a device operated by a restaurant employee;

transmitting, to each of the plurality of wireless devices, a bill for the order, the bill comprising the plurality of items;

receiving, from each of the plurality of wireless devices, a selection of a respective at least one of the plurality of items by the respective diner associated with the respective wireless device;

receiving, from each of the plurality of wireless devices, a respective tip amount designated by the respective diner associated with the respective wireless device;

calculating, for each of the plurality of diners, a respective total amount comprising a charge for the respective at least one of the plurality of items selected by the respective diner and the respective tip amount designated by the respective diner;

transmitting, to each of the plurality of wireless devices, the respective total amount for the respective diner associated with respective wireless device;

receiving, by the at least one computing device, from each of the plurality of wireless devices, a respective payment of the respective total amount for the respective diner associated with the respective wireless device; and receiving, by the at least one computing device, from each of the plurality of wireless devices, a respective grade for the quality of a dining experience from the respective user associated with the respective wireless device, wherein the respective tip amount for the respective diner is determined based on the respective grade received from the respective diner.

6. The machine readable medium of claim 5, wherein the plurality of items comprise food and beverages.

7. The machine readable medium of claim 5, wherein the login ID is transmitted to each of the plurality of wireless devices as a v-card via a wireless transmission from a device operated by a restaurant employee.

8. The machine readable medium of claim 5, wherein the respective total amount for each of the plurality of diners includes a respective amount for taxes for the respective at least one of the plurality of items selected by the respective diner.

9. A system comprising:

at least one computing device to:

receive, from each of a plurality of wireless devices, a login for a respective one of a plurality of diners associated with the respective wireless device, the plurality of diners comprising a party associated with an order comprising a plurality of items, such that the login comprises an ID and a table number transmitted to each of the plurality of wireless devices via a wireless transmission from a device operated by a restaurant employee;

transmit, to each of the plurality of wireless devices, a bill for the order, the bill comprising the plurality of items;

receive, from each of the plurality of wireless devices, a selection of a respective at least one of the plurality of items by the respective diner associated with the respective wireless device;

receive, from each of the plurality of wireless devices, a respective tip amount designated by the respective diner associated with the respective wireless device;

calculate, for each of the plurality of diners, a respective total amount comprising a charge for the respective at least one of the plurality of items selected by the respective diner and the respective tip amount designated by the respective diner;

transmit, to each of the plurality of wireless devices, the respective total amount for the respective diner associated with the respective wireless device; and receive, from each of the plurality of wireless devices, a respective grade for the quality of a dining experience from the respective user associated with the respective wireless device, wherein the respective tip amount for the respective diner is determined based on the respective grade received from the respective diner.

10. The computer implemented method of claim 1, wherein the respective payment for at least one of the plurality of diners is received electronically from the respective one of the plurality of wireless devices associated with the respective diner.

11. The computer implemented method of claim 1, wherein at least two of the plurality of diners select one of the plurality of items, wherein each of the at least two diners designates a respective percentage of responsibility for the one of the plurality of items, wherein the respective total amount for each of the at least two diners reflects a respective percentage charge for the one of the plurality of items in accordance with the respective percentage of responsibility designated by the respective diner.

12. The machine readable medium of claim 5, wherein the respective payment for at least one of the plurality of diners is received electronically from the respective one of the plurality of wireless devices associated with the respective diner.

13. The machine readable medium of claim 5, wherein at least two of the plurality of diners select one of the plurality of items, wherein each of the at least two diners designates a respective percentage of responsibility for the one of the plurality of items, wherein the respective total amount for each of the at least two diners reflects a respective percentage charge for the one of the plurality of items in accordance with the respective percentage of responsibility designated by the respective diner.

* * * * *